United States Patent
Yang et al.

(10) Patent No.: US 10,602,336 B2
(45) Date of Patent: Mar. 24, 2020

(54) METHOD FOR PROVIDING SERVICE USING NEAR FIELD COMMUNICATION AND ELECTRONIC DEVICE FOR SUPPORTING THE SAME

(71) Applicant: SAMSUNG ELECTRONICS CO., LTD., Suwon-si, Gyeonggi-do (KR)

(72) Inventors: Yi Yang, Suwon-si (KR); Myeonghwan Nam, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/266,169

(22) Filed: Feb. 4, 2019

(65) Prior Publication Data
US 2019/0246256 A1    Aug. 8, 2019

(30) Foreign Application Priority Data
Feb. 8, 2018    (KR) .................. 10-2018-0015581

(51) Int. Cl.
*H04B 5/00*        (2006.01)
*H04W 4/80*        (2018.01)
(Continued)

(52) U.S. Cl.
CPC ............. *H04W 4/80* (2018.02); *H04W 4/029* (2018.02); *H04W 12/004* (2019.01);
(Continued)

(58) Field of Classification Search
CPC ....... H04W 4/80; H04W 4/029; H04W 12/06; H04W 88/02; H04B 5/0025; H04B 5/0031; H04L 9/00
See application file for complete search history.

(56) References Cited

U.S. PATENT DOCUMENTS 10,152,706 B2    12/2018  Caceres et al.
2008/0162361 A1*  7/2008  Sklovsky ............... G06Q 20/32
                                                    705/65
(Continued)

FOREIGN PATENT DOCUMENTS

JP    2009-134614    6/2009
JP    2014-164580    9/2014
(Continued)

OTHER PUBLICATIONS

International Search Report dated May 17, 2019 in counterpart International Patent Application No. PCT/KR2019/001324.

*Primary Examiner* — Andrew Wendell
(74) *Attorney, Agent, or Firm* — Nixon & Vanderhye P.C.

(57) ABSTRACT

An electronic device is provided. The electronic device includes a secure element (SE) comprising circuitry and including an applet configured to provide a service using near field communication (NFC), an NFC circuit configured to provide NFC with a first external electronic device, a memory, and a processor electrically connected with the NFC circuit and the memory. The NFC circuit includes a monitoring circuit configured to analyze a first signal received from the applet. The monitoring circuit is configured to deliver a second signal corresponding to processing completion for a specified function included in the service, based on a result of analyzing the first signal.

20 Claims, 10 Drawing Sheets

(51) Int. Cl.
  *H04W 4/029* (2018.01)
  *H04W 88/06* (2009.01)
  *H04W 12/06* (2009.01)
  *H04W 12/00* (2009.01)
  *H04W 88/02* (2009.01)

(52) U.S. Cl.
  CPC . *H04W 12/00407* (2019.01); *H04W 12/0609* (2019.01); *H04W 88/06* (2013.01); *H04W 12/06* (2013.01); *H04W 88/02* (2013.01)

(56) References Cited

U.S. PATENT DOCUMENTS

| | | | |
|---|---|---|---|
| 2012/0173318 A1* | 7/2012 | Lee | G06Q 30/0241 705/14.4 |
| 2013/0311373 A1 | 11/2013 | Han et al. | |
| 2014/0256251 A1 | 9/2014 | Caceres et al. | |
| 2014/0366106 A1 | 12/2014 | Namkung et al. | |
| 2015/0348008 A1* | 12/2015 | Khan | G06Q 20/3227 705/44 |
| 2016/0099752 A1* | 4/2016 | Lee | H04B 5/0031 455/41.1 |
| 2016/0188924 A1* | 6/2016 | Tsukamoto | G06K 7/10158 455/41.1 |
| 2017/0091753 A1 | 3/2017 | May | |
| 2017/0177319 A1* | 6/2017 | Mark | G06F 8/61 |
| 2019/0102772 A1* | 4/2019 | Lerch | G06Q 20/32 |

FOREIGN PATENT DOCUMENTS

| | | |
|---|---|---|
| JP | 2017-004234 | 1/2017 |
| KR | 10-0815148 | 3/2008 |
| KR | 10-2011-0093602 | 8/2011 |
| KR | 10-1314432 | 10/2013 |

* cited by examiner

| Code | Name | Length | Description |
|---|---|---|---|
| CLA | Class | 1 | Class of instruction |
| INS | Instruction | 1 | Instruction code |
| P1 | Parameter 1 | 1 | Instruction parameter 1 |
| P2 | Parameter 2 | 1 | Instruction parameter 2 |
| Lc field | Length | variable 1 or 3 | Number of bytes present in the data field of the command |
| Data field | Data | variable=Lc | String of bytes sent in the data field of the command |
| Le field | Length | variable 1 or 3 | Maximum number of bytes expected in the data of the response to the command |

310
311 — CLA row
313 — INS row

| Code | Name | Length | Description |
|---|---|---|---|
| Data field | Class | variable=Lr | String of bytes received in the data field of the response |
| SW1 | Status byte 1 | 1 | Command processing status |
| SW2 | Status byte 2 | 1 | Command processing qualifier |

330
331 — SW1 row
333 — SW2 row

| Index | Service Name | Country or Region | AID | CLA & INS |
|---|---|---|---|---|
| 1 | C-Transit | CHN | Null | 80 54 |
| 2 | K-Money | Korea | D4100000030001 | 90 46 |
| 3 | G-CarKey | Germany | D27600015601140001 | 67 C7 |
| 4 | M-Card | Global | A0000000041010 | 80 AE |

630

| Index | Current Region | Service Name | Country or Region | AID | CLA & INS |
|---|---|---|---|---|---|
| 1 | O | C-Transit | CHN | Null | 80 54 |
| 2 | X | K-Money | Korea | D4100000030001 | 90 46 |
| 3 | X | G-CarKey | Germany | D27600015601140001 | 67 C7 |
| 4 | O | M-Card | Global | A0000000041010 | 80 AE |

650

| Index | Current Region | Service Name | Country or Region | Secure Element | AID | CLA & INS | Alert Method |
|---|---|---|---|---|---|---|---|
| 1 | O | C-Transit | CHN | ALL | Null | 80 54 | Vibration |
| 2 | X | K-Money | Korea | ALL | D4100000030001 | 90 46 | Vibration |
| 3 | X | G-CarKey | Germany | ALL | D27600015601140001 | 67 C7 | Vibration |
| 4 | O | M-Card | Global | ALL | A0000000041010 | 80 AE | Vibration |
| 5 | O | Service Provider1 | CHN | eSE | A000000333010101 A000000333010102 A000000333010103 | 80 A8 | UI Popup |
| 6 | O | Service Provider2 | Global | UICC | 53315632494410 | A4 B3 | Sound |

670

| Index | Secure Element | AID | CLA & INS |
|---|---|---|---|
| 1 | ALL | Null | 80 54 |
| 2 | ALL | A0000000041010 | 80 AE |
| 3 | eSE | A0000003330101* | 80 A8 |
| 4 | UICC | 53315632494410 | A4 B3 |

FIG. 6

```
<?xml version="1.0" encoding="utf-8"?>
<offhost-apdu-service
xmlns:android="http://schemas.android.com/apk/res/android
"
    android:description="@string/servicedesc"
    android:region="Global"
    android:apduServiceBanner="@drawable/ese">

<aid-group
android:description="@string/aiddescription"
        android:category="other">
        <aid-filter android:name="53315632494410"/>
        <trigger-info android:CLAINS="A4 B3"/>
    </aid-group>
</offhost-apdu-sevece>
```

710 — (code block)
711 — android:region="Global"
713 — <aid-filter android:name="53315632494410"/>
715 — <trigger-info android:CLAINS="A4 B3"/>

FIG. 7

METHOD FOR PROVIDING SERVICE USING NEAR FIELD COMMUNICATION AND ELECTRONIC DEVICE FOR SUPPORTING THE SAME

CROSS-REFERENCE TO RELATED APPLICATION

This application is based on and claims priority under 35 U.S.C. § 119 to Korean Patent Application No. 10-2018-0015581, filed on Feb. 8, 2018, in the Korean Intellectual Property Office, the disclosure of which is incorporated by reference herein its entirety.

BACKGROUND

1. Field

The disclosure relates to technologies of providing services using near field communication (NFC).

2. Description of Related Art

Recently, an electronic device, such as a smartphone, may provide a service using NFC. For example, the electronic device may install (or register) an application (e.g., an applet), a so-called mobile card (or smart card), capable of being used as a credit card, a debit card, a transportation card, an ID card, or a smart key, in a secure element (SE) through a card emulation mode of NFC technology and may provide various services, such as a payment service, using the installed application In a conventional electronic device, although an applet installed in an SE completes processing for a specified function included in a service, when the applet does not deliver a signal (or event) corresponding to the processing completion for the specified function to an application which provides a user interface for the service and is stored in a memory of the electronic device, a user may fail to know whether processing for the specified function is completed. Furthermore, although the applet delivers the signal to the application, when an instruction processing unit for notifying the user of the processing completion for the specified function is not included in the application, the user may fail to know whether the processing for the specified function is completed. In addition, the application should not be stored in the memory in connection with the service.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, an aspect of the disclosure is to provide a method for analyzing a response signal received from an applet in response to a request signal of an external electronic device by means of a monitoring circuit included in a near field communication (NFC) circuit for communication between the external electronic device and the applet installed in a secure element (SE) and notifying a user of processing completion for a specified function included in a service based on the analyzed result and an electronic device for supporting the same.

In accordance with an aspect of the disclosure, an electronic device is provided. The electronic device may include a secure element (SE) comprising circuitry and including an applet configured to provide a service using near field communication (NFC), an NFC circuit configured to provide NFC with a first external electronic device, a memory, and a processor configured to be electrically connected with the NFC circuit and the memory. The NFC circuit may include a monitoring circuit configured to analyze a first signal received from the applet. The monitoring circuit may be configured to deliver a second signal corresponding to processing completion for a specified function included in the service to the processor based on a result of analyzing the first signal.

In accordance with another aspect of the disclosure, a method for providing a service using near field communication (NFC) in an electronic device is provided. The method may include receiving a first signal from an applet configured to be installed in an SE and providing a service using the NFC, analyzing the first signal using a monitoring circuit included in an NFC circuit configured to provide NFC with a first external electronic device, and delivering a second signal corresponding to processing completion for a specified function included in the service to a processor of the electronic device based on the result of analyzing the first signal.

According to various example embodiments of the disclosure, the electronic device may notify a user of the processing completion for a specified function, although the applet installed in an SE may fail to deliver a signal corresponding to processing completion for the specified function included in a service to an application stored in a memory, although an instruction processing unit for notifying the user of the processing completion for the specified function is not included in the application, or although the application is not stored in the memory.

In addition, various effects directly or indirectly ascertained through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 3 is a diagram illustrating an example request signal of an external electronic device and a response signal of an applet installed in the SE according to an embodiment;

FIG. 6 is a diagram illustrating example information about a service according to an embodiment;

FIG. 7 is a diagram illustrating an example method for setting information about a service selected by a user, according to an embodiment;

DETAILED DESCRIPTION

Figure 1:
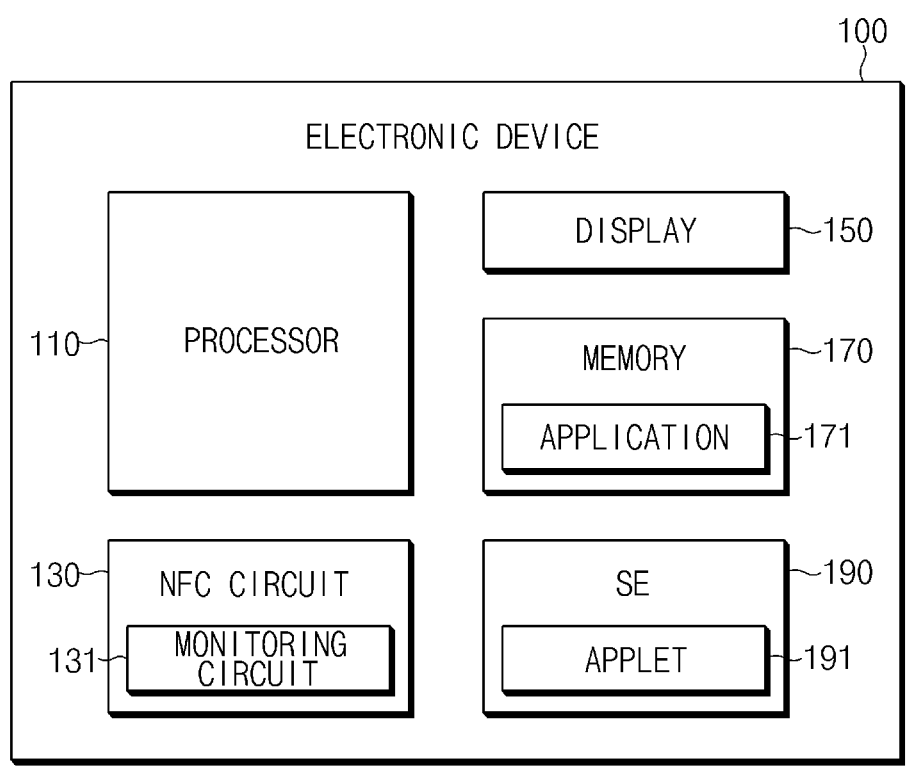
FIG. 1 is a block diagram illustrating an example configuration of an electronic device associated with providing a service according to an embodiment.

FIG. 1 is a block diagram illustrating an example configuration of an electronic device associated with providing a service according to an embodiment.

Referring to FIG. 1, an electronic device 100 may include a processor (e.g., including processing circuitry) 110, a near field communication (NFC) circuit 130, a display 150, a memory 170, and a secure element (SE) (e.g., including processing circuitry, memory elements and/or program elements) 190. However, the configuration of the electronic device 100 is not limited thereto. According to various embodiments, the electronic device 100 may fail to include at least one of the above-mentioned components and may further include at least one other component.

The processor 110 may include various processing circuitry and execute, for example, an arithmetic operation and/or data processing associated with control and/or communication of at least one other component of the electronic device 100. The processor 110 may drive an operating system (OS) or an application program (e.g., an application 171) to control a plurality of hardware or software components connected to the processor 110 and may perform a variety of data processing and various arithmetic operations.

According to an embodiment, the processor 110 may install (or register) an applet 191, a so-called "mobile card (or smart card)", capable of being used, for example, and without limitation, as a credit card, a debit card, a transportation card, an ID card, a smart card, or the like, through a card emulation (CE) function of NFC technology. The applet 191 may be installed in the SE 190 and may may transmit and receive signals associated with a service (e.g., a payment service) with an external electronic device via the NFC circuit 130. For example, the applet 191 may transmit and receive signals associated with a payment service with a point of sale (POS) terminal via the NFC circuit 130. The signals transmitted and received with the external electronic device by the applet 191 may be processed by a separate processor included in the SE 190.

According to an embodiment, the processor 110 may drive the application 171 stored (or installed) in the memory 170 to execute instructions included in the application 171. For example, the processor 110 may drive the application 171 which provides a user interface in connection with a service (e.g., the payment service) using NFC and may notify a user of a procedure or processing completion for functions (e.g., a payment function) included in the service through a specified notification method (e.g., a vibration, sound, or popup object output, or the like) depending on a type of the service. For example, the processor 110 may output a display object notifying the user of the procedure or processing completion for the functions included in the service on the display 150. As another example, the processor 110 may output a voice object notifying the user of the procedure or processing completion for the functions included in the service through a speaker (not shown). As another example, the processor 110 may notify the user of the procedure or processing completion for the functions included in the service through a vibration using a haptic module (e.g., 879 in FIG. 8). In other words, in a process of transmitting and receiving a signal with the external electronic device to process the function included in the service, when the applet 191 delivers a signal (or event) corresponding to a procedure or processing completion of the function to the processor 110, the processor 110 may process the transmitted signal (or event) by means of the application 171. The processor 170 may process the signal (or event) according to the routine of instructions defined in the application 171 and may notify the user of a procedure and/or processing completion of the function depending on a type of the service by means of a specific notification method.

According to an embodiment, the processor 110 may receive a signal (or event) corresponding to processing completion for the function included in the service from a monitoring circuit 131 included in the NFC circuit 130. In this case, the processor 110 may process the signal according to the routine of the instructions defined in the application 171 and may notify the user of the processing completion of the function by means of a specified notification method depending on a type of the service. In some embodiments, when the application 171 associated with processing the signal is not installed in the memory 170, the processor 110 may process the signal by means of a program (or a set of instructions) previously stored in the memory 170, thus notifying the user of the processing completion of the function. Thus, although the applet 191 installed in the SE 190 does not deliver a signal corresponding to processing completion for a specified function included in the service to the application 171 stored in the memory 170, the processor 110 may receive a signal corresponding to processing completion for the specified function via the monitoring circuit 131, thus providing a user interface for notifying the user of the processing completion of a specified function.

According to an embodiment, the processor 110 may output a list of method(s) for notifying the user of the processing completion for the specified function on the display 150 to select the method depending on a type of the applet 191. For example, the processor 110 may classify a type of the applet 191 as a type of a service, such as, for example, and without limitation, a credit card, a debit card, a transportation card, an ID card, a smart card, or the like, and may output a list of notification method(s) (e.g., a vibration, sound, pop-up object output or the like) on the display 150 to differently specify the notification method depending on the type of the service.

The NFC circuit 130 may perform NFC between the electronic device 100 and the external electronic device. For example, the electronic device 100 and the external electronic device may be connected over NFC via the NFC circuit 130 and may transmit and/or receive wireless data. According to an embodiment, the NFC circuit 130 may perform communication between the external electronic device and the applet 191 installed in the SE 190. For example, the NFC circuit 130 may transmit a request signal (e.g., a command APDU (C-APDU)) of the external electronic device to the applet 191 installed in the SE 190 and may transmit a response signal (e.g., a response APDU (R-APDU)) of the applet 191 to the external electronic device. According to an embodiment, the NFC circuit 130 may be connected with the SE 190 through a specified interface (e.g., a single wire protocol (SWP), a universal serial bus (USB), a universal asynchronous receiver/transmitter (UART), a serial peripheral interface (SPI), an inter-integrated circuit (I2C), or the like).

The NFC circuit 130 may include the monitoring circuit 131. The monitoring circuit 131 may analyze a response signal received from the applet 191 in response to a request signal of the external electronic device. According to an embodiment, the monitoring circuit 131 may deliver a signal (or event (e.g., EVT_TRANSACTION)) corresponding to processing completion for a specified function included in a service provided from the applet 191 to the processor 110 based on the result of analyzing the response signal.

The display 150 may display, for example, a variety of content (e.g., a text, an image, a video, an icon, a symbol, or the like) to the user. According to an embodiment, the display 150 may output a screen where the application 171 is executed. The display 150 may include a touch screen. For example, and without limitation, the display 150 may receive a touch, a gesture, proximity, a hovering input, or the like, using an electronic pen or a part of a user's body.

The memory 170 may store, for example, instructions and/or data associated with at least one other component of the electronic device 100. According to an embodiment, the memory 170 may store the application 171.

The application 171 may include an application associated with a service provided from a service provider. According to an embodiment, the application 171 may include an application which provides a user interface for the service. For example, the application 171, when executed by the processor 110, may control the display to display an object notifying the user of a procedure or processing completion for the functions included in the service.

The SE 190 may include a storage medium which securely store information (e.g., authentication information) required for security and the applet 191 (or an application) using the information and may include a secure module, a chipset, a secure key, or the like, capable of user identification. For example, the SE 190 may include, for example, and without limitation, a subscriber identity module/universal integrated circuit card (SIM/UICC), an embedded secure element (eSE), a micro secure digital (SD) card, or the like. According to an embodiment, the SE 190 may be configured as a separate chip or the like. According to an embodiment, the SE 190 may include, for example, and without limitation, a separate processor, a permanent storage device, a memory, a register, or the like. According to an embodiment, the electronic device 100 may include the at least one SE 190.

The applet 191 may provide a function of a mobile card (or a smart card) capable of being used as, for example, and without limitation, a credit card, a debit card, a transportation card, an ID card, a smart card, or the like, through, for example, a CM function. For example, the applet 191 may transmit and receive signals associated with the service (e.g., the payment service) with the external electronic device via the NFC circuit 130. For example, the applet 191 may transmit and receive signals associated with the payment service with a POS terminal via the NFC circuit 130.

As described above, according to various example embodiments, an electronic device (e.g., an electronic device 100 or 801) may include a secure element (SE) (e.g., an SE 190) comprising circuitry and including an applet (e.g., an applet 191) configured to provide a service using near field communication (NFC), an NFC circuit (e.g., an NFC circuit 130 or a communication module 890) configured to provide NFC with a first external electronic device, a memory (e.g., a memory 170 or 830), and a processor (e.g., a processor 110 or 820) electrically connected with the NFC circuit and the memory. The NFC circuit may include a monitoring circuit (e.g., a monitoring circuit 131) configured to analyze a first signal received from the applet. The monitoring circuit may be configured to deliver a second signal corresponding to processing completion for a specified function included in the service, based on the result of analyzing the first signal.

According to various example embodiments, the electronic device may further include at least one of a display (e.g., a display 150 or a display device 860), a speaker (e.g., a sound output device 855), and a haptic module (e.g., a haptic module 879). The processor may be configured to control the electronic device to notify a user of the processing completion for the specified function through at least one of the display, the speaker, and the haptic module in response to receiving the second signal.

According to various example embodiments, the electronic device may further include a display (e.g., a display 150 or a display device 860). The processor may be configured to control the electronic device to output a list including at least one method for notifying a user of the processing completion for the specified function on the display, and to select the method depending on a type of the applet.

According to various example embodiments, the SE may include a secure module comprising circuitry, a chipset, and/or a secure key capable of performing user authentication.

According to various example embodiments, the service may include a card emulation service. The specified function may include at least one of a payment function, an identification card function, and a smart key function.

According to various example embodiments, the electronic device may further include a communication circuit (e.g., a communication module 890) configured to communicate with a second external electronic device. The processor may be configured to receive identification information of the applet and a code value indicating the processing completion for the specified function from the second external electronic device via the communication circuit, to map the identification information of the applet to the code value, and to control the electronic device to store the mapped information in the memory.

According to various example embodiments, the processor may be configured to deliver the mapped information to the NFC circuit.

According to various example embodiments, the monitoring circuit may be configured to determine whether the code value included in the mapped information exists in the first signal and to deliver the second signal to the processor when the code value exists in the first signal.

According to various example embodiments, the electronic device may further include a global positioning system (GPS) (e.g., a communication module 890). The processor may be configured to determine a location of the electronic device based on location information of the electronic device, the location information being obtained via the GPS, to determine whether the service provided by the applet is available in the location of the electronic device, and deliver the mapped information to the NFC circuit when the service is available in the location of the electronic device.

According to various example embodiments, the monitoring circuit may be configured to stop analyzing the first signal when power supplied to the NFC circuit is less than or equal to a specified level.

Figure 2:
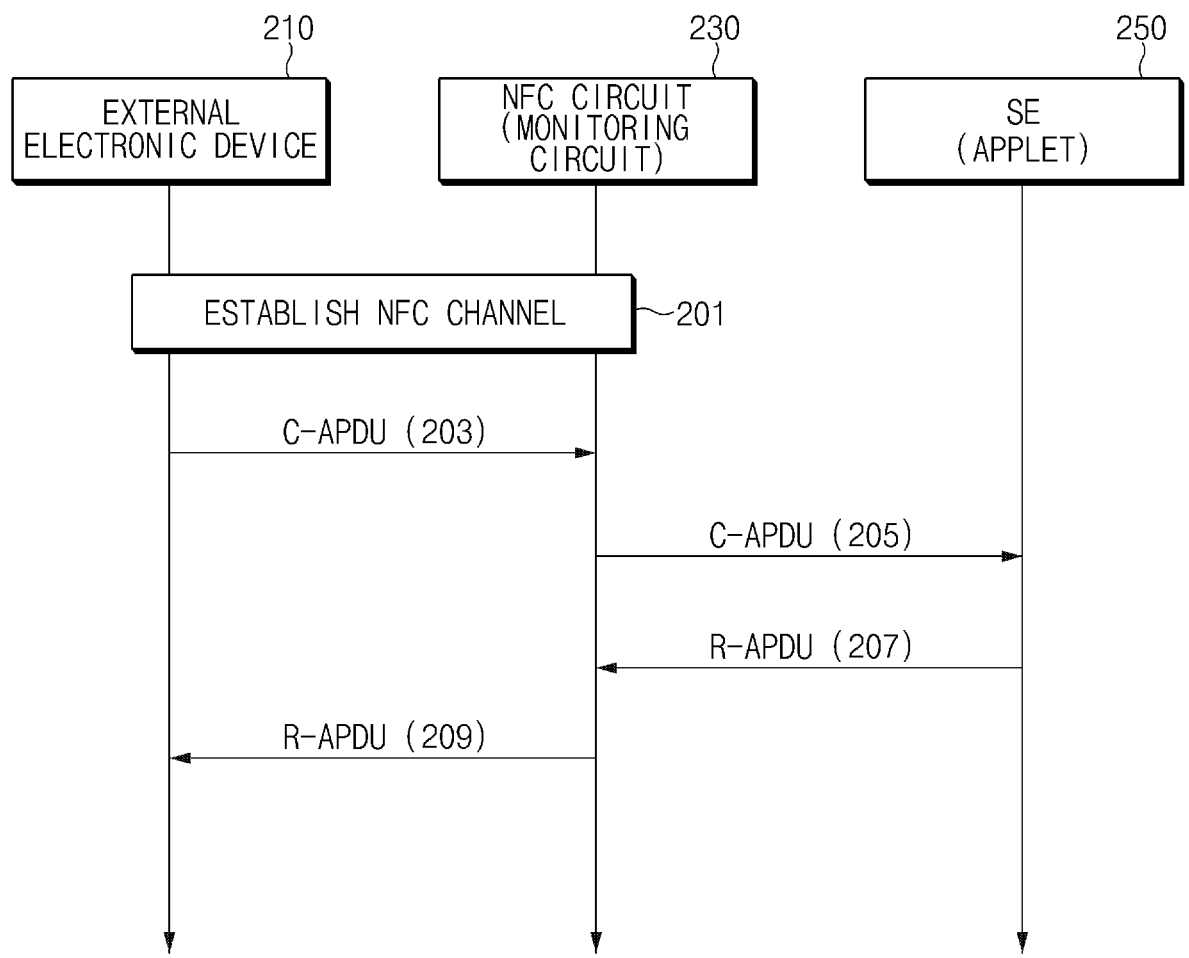
FIG. 2 is a sequence diagram illustrating example signal flow between an external electronic device and an applet installed in a secure element (SE) according to an embodiment.

FIG. 2 is a sequence diagram illustrating example signal flow between an external electronic device and an applet installed in a secure element (SE) according to an embodiment.

Referring to FIG. 2, in operation 201, an NFC circuit 230 (e.g., an NFC circuit 130 of FIG. 1) included in an electronic device (e.g., an electronic device 100 of FIG. 1) may establish an NFC channel with an external electronic device 210. Furthermore, although not illustrated, the NFC circuit 230 may notify an SE 250 (e.g., an SE 190 of FIG. 1) that the NFC channel is established with the external electronic device 201.

When the NFC channel is established, in operation S203, the NFC circuit 230 may receive a request signal (e.g., C-APDU) from the external electronic device 210. The request signal may include, for example, an information request signal for a specified function (e.g., a payment function), a processing completion signal for the specified function, or the like.

When receiving the request signal from the external electronic device 210, in operation 205, the NFC circuit 230 may deliver the received request signal to the SE 250. In this case, an applet (e.g., an applet 191 of FIG. 1) installed in the SE 250 may perform an operation for processing the request signal.

When the performance of the operation for processing the request signal is completed, in operation 207, the applet may deliver the result of performing the operation as a response signal (e.g., R-APDU) to the request signal to the NFC circuit 230.

When receiving the response signal, in operation 209, the NFC circuit 230 may transmit the received response signal to the external electronic device 210.

According to an embodiment, when the request signal received in operation 205 is a processing completion signal for the specified function, the applet may include a code value indicating processing completion for the specified function in the response signal. For example, the applet may set a state word included in the response signal to a code value indicating the processing completion for the specified function (e.g., the hex code '9000' defined in ISO/IEC 7816-4).

According to an embodiment, in operation 207, receiving the response signal, the NFC circuit 230 may analyze the response signal by means of a monitoring circuit (e.g., a monitoring circuit 131 of FIG. 1). When the code value indicating the processing completion for the specified function is included in the response signal, the monitoring circuit may generate a signal (or event) corresponding to the processing completion for the specified function and may deliver the generated signal (or event) to a processor (e.g., a processor 110 of FIG. 1). For example, when the state word included in the response signal is set to the code value indicating the processing completion for the specified function, the monitoring circuit may deliver a signal (or event (e.g., EVT_TRANSACTION)) corresponding to the processing completion for the specified function to the processor. In this case, the processor may notify a user of the processing completion for the specified function through a specified notification method depending on a type of a service. For example, the processor may generate a display object for notifying the user of the processing completion for the specified function and may output the generated display object on a display (e.g., a display 150 of FIG. 1). For another example, the processor may output a voice object for notifying the user of the processing completion for the specified function through a speaker. For another example, the processor may notify the user of the processing completion for the specified function through vibration using a haptic module.

FIG. 3 is a diagram illustrating an example request signal of an external electronic device and a response signal of an applet installed in the SE according to an embodiment.

Referring to FIG. 3, a request signal (e.g., C-APDU) received from an external electronic device (e.g., an external electronic device 210 of FIG. 2) may include a plurality of information such as, for example, and without limitation, information listed in Table 310. For example, a class of instruction (CLA) 311 and an instruction code (INS) 313 may be included in the request signal.

Values set as the CLA 311 and the INS 313 may be differently set according to a type of an applet (e.g., an applet 191 of FIG. 1) installed in a SE (e.g., an SE 190). Thus, when the values set as the CLA 311 and the INS 313 are verified, it is verified that the request signal received from the external electronic device is a signal delivered to any applet.

According to an embodiment, information about the values set as the CLA 311 and the INS 313 may be stored and managed in a local database (e.g., a memory 170 of FIG. 1). For example, a processor (e.g., a processor 110 of FIG. 1) of an electronic device may receive information about a service from a server via a communication circuit and may update the information about the values set as the CLA 311 and the INS 313 among information about the service to the local database. For another example, when a learning function for a service is loaded into the electronic device, the processor may verify information about a service selected by a user while learning for the service is performed, thus optimizing the information about the values set as the CLA 311 and the INS 313, stored in the local database.

A response signal (e.g., R-APDU) to the request signal received from the external electronic device may include a plurality of information, such as, for example, and without limitation, information listed in Table 330. For example, the response signal may include a state word. In Table 330, it is shown that the state word has a size of 2 bytes. For example, the state word may be represented as a combination of a first state word (SW1) 331 with a size of 1 byte and a second state word (SW2) 333 with a size of 1 byte.

According to an embodiment, when the state word is set to a code value (e.g., the hex code '9000') indicating processing completion for a specified function, for example, when the SW1 331 is set to the hex code '90' and when the SW2 333 is set to the hex code '00', a monitoring circuit (e.g., a monitoring circuit 131 of FIG. 1) may generate a signal (or event (e.g., EVT_TRANSACTION)) corresponding to the processing completion for the specified function and may deliver the generated signal (or event) to the processor (e.g., the processor 110).

Figure 4:
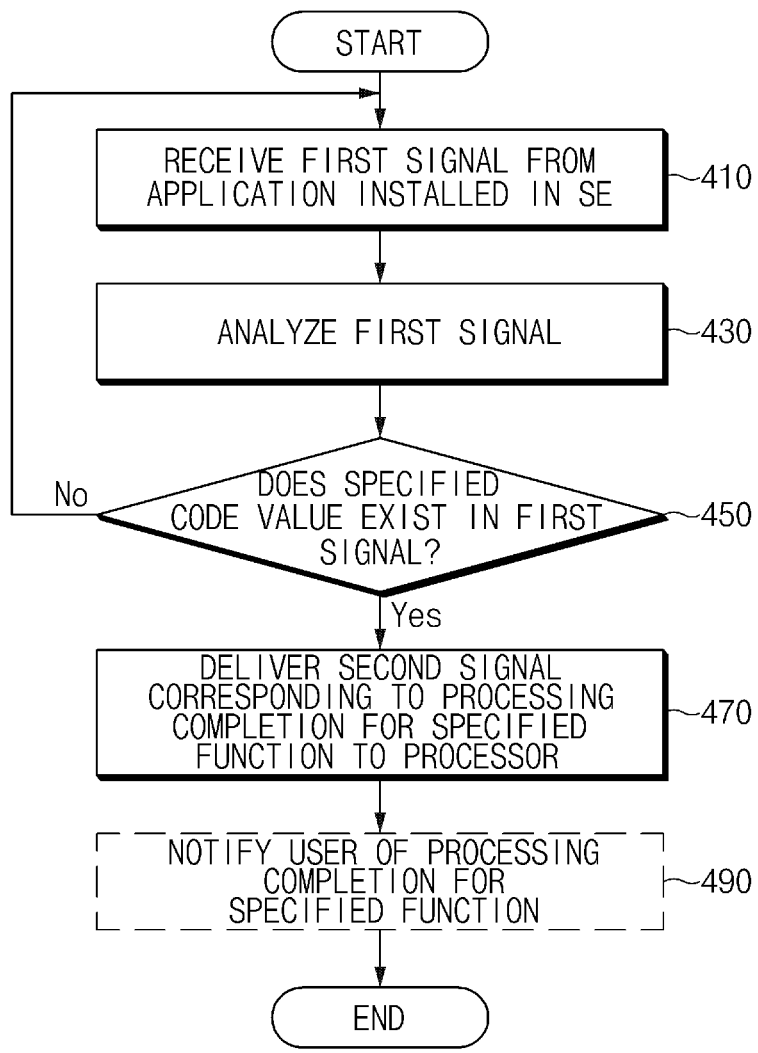
FIG. 4 is a flowchart illustrating an example method of operating an electronic device associated with providing a service according to an embodiment.

FIG. 4 is a flowchart illustrating an example method of operating an electronic device associated with providing a service according to an embodiment.

Referring to FIG. 4, in operation 410, an NFC circuit (e.g., an NFC circuit 130 or 230 of FIG. 1 or 2) included in an electronic device (e.g., an electronic device 100 of FIG. 1) may receive a first signal (e.g., a response signal (R-APDU))

from an applet (e.g., an applet 191 of FIG. 1) installed in an SE (e.g., an SE 190 or 250 of FIG. 1 or 2). For example, the NFC circuit may deliver a request signal (e.g., C-APDU), received from an external electronic device (e.g., an external electronic device 210 of FIG. 2), to the applet installed in the SE. The applet may deliver a response signal to the request signal to the NFC circuit.

In operation 430, a monitoring circuit (e.g., a monitoring circuit 131 of FIG. 1) included in the NFC circuit may analyze the received first signal. For example, the monitoring circuit may verify a state word (e.g., a SW1 331 and a SW2 333 of FIG. 3) included in the first signal.

In operation 450, the monitoring circuit may determine whether a specified code value exists in the first signal. For example, the monitoring circuit may determine whether a state word included in the first signal is set to the specified code value (e.g., the hex code '9000').

When the specified code value exists in the first signal (e.g., when the state word included in the first signal is set to the specified code value), in operation 470, the monitoring circuit may deliver a second signal corresponding to processing completion for a specified function to a processor (e.g., a processor 110 of FIG. 1). According to an embodiment, when the specified code value exists in the first signal, the monitoring circuit may determine whether processing for the specified function (e.g., a payment function) is completed to generate the second signal corresponding to the processing completion for the specified function. Furthermore, the monitoring circuit may deliver the generated second signal to the processor. According to an embodiment, the second signal may include a pre-defined event signal (e.g., EVT_TRANSACTION).

Receiving the second signal, in operation 490, the processor may notify the user of the processing completion for the specified function. According to an embodiment, the processor may generate a display object for notifying the user of the processing completion for the specified function and may output the generated display object on a display (e.g., a display 150 of FIG. 1). According to another embodiment, the processor may output a voice object for notifying the user of the processing completion for the specified function through a speaker. According to another embodiment, the processor may notify the user of the processing completion for the specified function through vibration using a haptic module.

Figure 5:
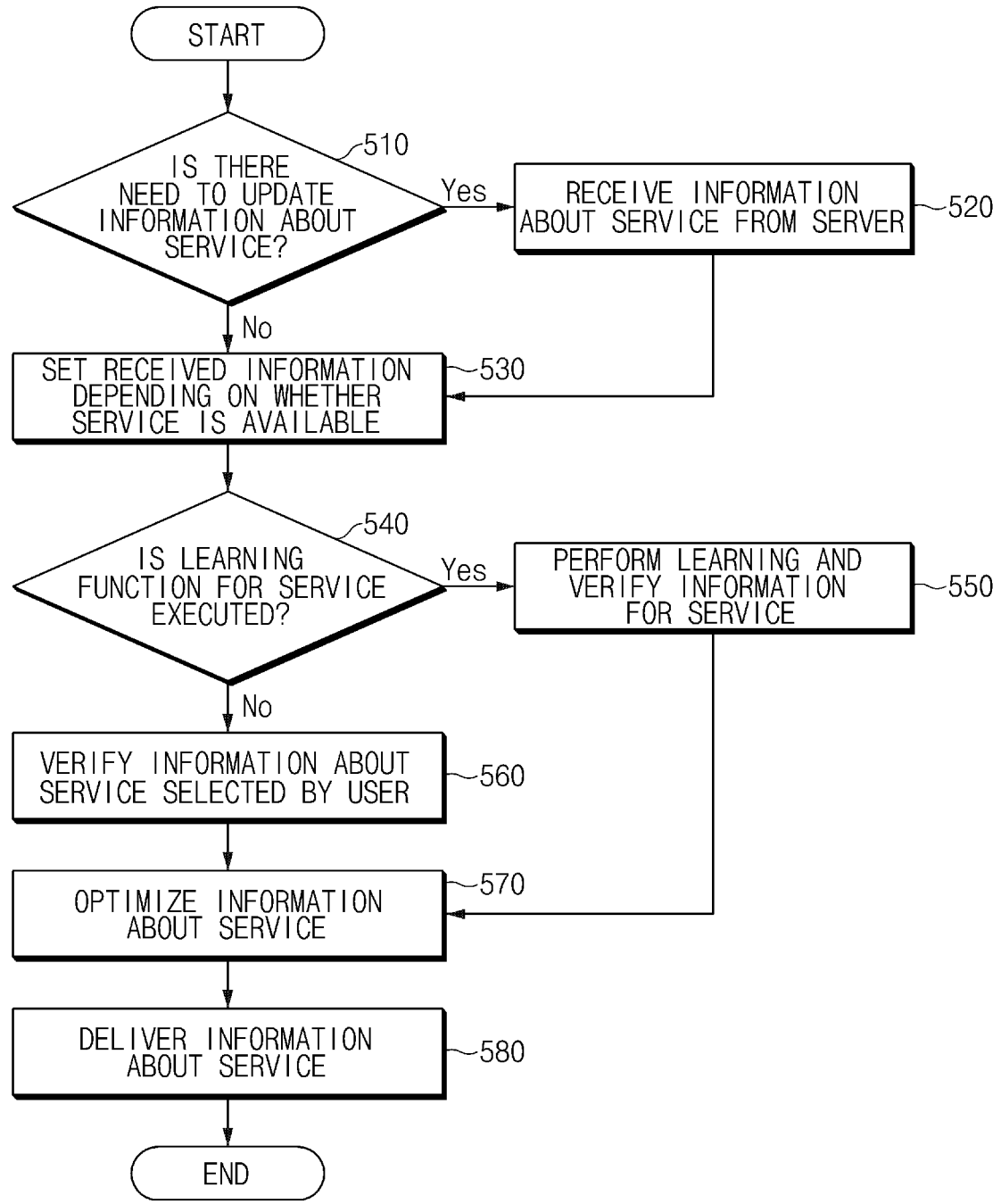
FIG. 5 is a flowchart illustrating an example operation of a processor associated with providing a service according to an embodiment.

FIG. 5 is a flowchart illustrating an example operation of a processor associated with providing a service according to an embodiment.

Referring to FIG. 5, in operation 510, a processor (e.g., a processor 110 of FIG. 1) of an electronic device (e.g., an electronic device 100 of FIG. 1) may determine whether there is a need to update information about a service. According to an embodiment, the processor may determine whether there is a need to update information about a service stored in a local database (e.g., a memory 170 of FIG. 1) to a server. The information about the service may include, for example, information about an applet (e.g., an applet 191 of FIG. 1) installed in an SE (e.g., an SE 190 of FIG. 1). The information about the applet may include, for example, trigger information indicating whether an entity to process a request signal received from an external electronic device (e.g., an external electronic device 210 of FIG. 2) corresponds to any applet. For example, information about a CLA (e.g., a CLA 311 of FIG. 3) and an INS (e.g., an INS 313 of FIG. 3) set according to a type of the applet may be used as the trigger information.

When there is the need to update the information about the service, in operation 520, the processor may receive information about a service from the server via a communication circuit.

In operation 530, the processor may set the received information depending on whether the service is available. According to an embodiment, the processor may set information about the service stored in the local database depending on location information (or local information) in which the service is available. For example, when the electronic device is located in a first area, the processor may be configured to use only a service which is available in the first area among services stored in the local database. According to an embodiment, the location information of the electronic device may be obtained via a global positioning system (GPS) or the like.

In operation 540, the processor may determine whether a learning function for the service is executed. When the learning function for the service is executed, in operation 550, the processor may verify information about a service selected by a user while learning for the service is performed and may update information about the service stored in the local database. For example, when the user selects a specific service through a tap & pay function, the processor may deliver an applet ID (AID) of an apple which provides the specific service and information of an SE in which the applet is installed, together with information indicating a learning state, to a monitoring circuit (e.g., a monitoring circuit 131 of FIG. 1). In this case, the monitoring circuit may determine whether information about the selected service is optimized, through an analysis of a request signal (e.g., C-APDU) received from the external electronic device and a response signal (e.g., R-APDU) received from the applet.

According to an embodiment, when the learning function for the service is not executed, in operation 560, the processor may verify information about a service selected by the user. According to an embodiment, the processor may verify information about a service selected by means of the tap & pay function by the user. For example, the processor may verify an AID of an applet which provides the service and trigger information of the applet (e.g., information about a CLA (e.g., the CLA 311) and an INS (e.g., the INS 313) which are set according to a type of the applet) through a specific file (e.g., an xml file) included in the applet. For example, the processor may parse the specific file and may verify trigger information of the applet. The specific file included in the applet will be described with reference to FIG. 7. In some embodiments, the processor may verify secure information about the applet and the validity of trigger information of the applet.

In operation 570, the processor may optimize the information about the service. For example, the processor may optimize information about the service learned in operation 550 or information about the service verified in operation 560. For example, as a result of verifying the secure information about the applet and the validity of the trigger information of the applet, when security for the applet is reduced or when there is no validity of the trigger information of the applet, the processor may fail to deliver the information about the applet to the monitoring circuit. In other words, the processor may fail to deliver the trigger information about the applet to the monitoring circuit not to communicate with the external electronic device through the applet. For another example, when information about an applet stored in the local database is duplicated and stored, the processor may leave only one piece of information and may delete the remaining information. For another example, when some of a plurality of information about an applet stored in the local database are similar to each other, the processor may merge the similar information. For example, when a first applet and a second applet are available within the same first area from the same first service provider, the processor may merge an AID of the first applet and an AID of a second applet. For example, when the AID of the first applet is "A000000333010101" and when the AID of the second applet is "A000000333010102", the processor may merge the AIDs of the first and second applets which are available in the first area from the first service provider into "A0000003330101*".

In operation 580, the processor may deliver the information about the service to the monitoring circuit. For example, the processor may deliver the information about the applet, optimized in operation 570, to the monitoring circuit. In this case, using the information about the applet delivered to the monitoring circuit, the monitoring circuit may analyze a response signal received from the SE and may determine whether to deliver a signal (or event) corresponding to the analyzed result to the processor.

As described above, according to an example embodiment, a method for providing a service using near field communication (NFC) in an electronic device may include receiving a first signal from an applet installed in a secure element (SE) and configured provide a service using the NFC, analyzing the first signal via a monitoring circuit included in an NFC circuit configured to provide NFC with a first external electronic device, and delivering a second signal corresponding to processing completion for a specified function included in the service to a processor of the electronic device based on the result of analyzing the first signal.

According to various example embodiments, the method may further include notifying a user of the processing completion for the specified function through at least one of a display, a speaker, or a haptic module of the electronic device.

According to various example embodiments, the method may further include outputting a list of method(s) for notifying a user of the processing completion for the specified function on a display of the electronic device to select the method according to a type of the applet.

According to various example embodiments, the SE may include a secure module, a chipset, or a secure key capable of performing user identification.

According to various example embodiments, the service may include a card emulation service, and the specified function may include at least one of a payment function, an identification card function, and a smart key function.

According to various example embodiments, the method may further include receiving identification information of the applet and a code value indicating the processing completion for the specified function from a second external electronic device via a communication circuit configured to provide communication with the second external electronic device, mapping the identification information of the applet to the code value, and storing the mapped information in a memory of the electronic device.

According to various example embodiments, the method may further include delivering the mapped information to the NFC circuit.

According to various example embodiments, the analyzing of the first signal may include determining whether the code value included in the mapped information exists in the first signal. The delivering of the second signal to the processor may be performed when the code value exists in the first signal.

According to various example embodiments, the method may further include obtaining location information of the electronic device via a global positioning system (GPS) of the electronic device, determining a location of the electronic device based on the location information, determining whether the service provided by the applet is available in the location of the electronic device, and delivering the mapped information to the NFC circuit when the service is available in the location of the electronic device.

According to various example embodiments, the method may further include stopping analyzing the first signal when power supplied to the NFC circuit is less than or equal to a specified level.

FIG. 6 is a diagram illustrating example information about a service according to an embodiment.

Referring to FIG. 6, as illustrated in Table 610, a processor (e.g., a processor 110 of FIG. 1) of an electronic device (e.g., an electronic device 100 of FIG. 1) may receive information about a service (e.g., information about an applet) from a server. For example, the processor may receive a type of a service (e.g., Service Name illustrated in Table 610), an area where the service is available (e.g., Country or Region illustrated in Table 610), an AID of an applet which provides the service (e.g., AID illustrated in Table 610), and trigger information of the service (or the applet) (e.g., CLA & INS illustrated in Table 610) from the server via the communication circuit.

According to an embodiment, the processor may set information about the service stored in a local database (e.g., a memory 170 of FIG. 1) depending on location information where the service is available (e.g., an area where the service is available). For example, as illustrated in Table 630, the processor may include information indicating whether the service is a currently available service (e.g., Current Region illustrated in Table 630) in the information about the service, received from the server. For example, the processor may obtain location information of the electronic device via a GPS or the like and may determine whether the service is the currently available service based on the area where the service is available.

According to an embodiment, the processor may add information about a service through a learning function for a service or by the selection of a user. For example, the processor may update information about a service stored in the local database using information about a service verified through learning. For another example, the processor may verify information about a service selected by means of a tap & pay function by the user and may update information about a service stored in the local database using the verified information of the service. Table 650 illustrates a state where the processor updates the information about the service through the learning function for the service and/or by the selection of the user. For example, information corresponding to indexes 5 and 6 illustrated in Table 650 indicates updated information.

According to an embodiment, the processor may provide a user interface for allowing a user to differently select a method for notifying the user of processing completion for a specified function among functions included in a service, depending on a type of the service (or an applet). For example, the processor may classify a type of the service as a type of a service such as a credit card, a debit card, a transportation card, an ID card, or a smart card and may output a list of a notification method (e.g., a vibration, sound, pop-up object output or the like) on a display (e.g., a display 150 of FIG. 1) to differently specify the notification method depending on the type of the service. Furthermore, the processor may include the notification method (e.g., Alert Method illustrated in Table 650) in information about a service stored in the local database.

According to an embodiment, the processor may optimize information about a service stored in the local database. For example, when information about a service stored in the local database is duplicated and stored, the processor may leave only one piece of information and may delete the remaining information. For another example, when some of a plurality of information about a service stored in the local database are similar to each other, the processor may merge the similar information. For example, as shown in Table 670, the processor may merge identifiers of similar applets among information corresponding to index 5 illustrated in Table 650 into one. For example, when AIDs of a first applet, a second applet, and a third applet for receiving a service from the same service provider in the same area are similar to each other, the processor may merge the AIDs of the first applet, the second applet, and the third applet into one AID. Thus, as shown in Table 670, the processor may leave the prefixed (or specified) same portion (e.g., "A0000003330101") in the AID (e.g., "A0000000333010101") of the first applet, the AID (e.g., "A0000000333010102") of the second applet, and the AID (e.g., "A000000333010103") of the third applet and may change the remaining portion to a specified code (e.g., "*"), thus merging the AIDs into one AID (e.g., "A0000003330101*").

According to an embodiment, the processor may deliver optimized information about a service stored in the local database to a monitoring circuit (e.g., a monitoring circuit 131 of FIG. 1). For example, the processor may deliver only information about a service which is available in an area where the electronic device is located to the monitoring circuit. Furthermore, when delivering the information about the service to the monitoring circuit, the processor may deliver only information used by the monitoring circuit. For example, as shown in Table 4 670, the processor may deliver only a number of a service (e.g., Index defined in Table 4 670), information of an SE in which an applet which provides the service is installed (e.g., Secure Element defined in Table 4 670), an AID of the applet (e.g., AID defined in Table 4 670), and trigger information of the applet (e.g., CLA & INS defined in Table 4 670) to the monitoring circuit.

FIG. 7 is a diagram illustrating an example method for setting information about a service selected by a user, according to an embodiment.

Referring to FIG. 7, a processor (e.g., a processor 110 of FIG. 1) of an electronic device (e.g., an electronic device 100 of FIG. 1) may verify information about an applet which provides a service, through a specific file (e.g., an xml file 710) included in the applet. The specific file 710 may include an AID of the applet, trigger information of the applet (e.g., information about a CLA and an INS set according to a type of the applet), and information about an area where the service is available. As shown in FIG. 7, the information about the applet may be verified through a specified tag defined in the specific file 710 and a value set in the tag. For example, the information about the area where the service is available may be verified through a first value 711 set in a first tag. The information about the AID of the applet may be verified through a second value 713 set in a second tag. The trigger information of the applet may be verified through a third value 715 set in a third tag.

Figure 8:
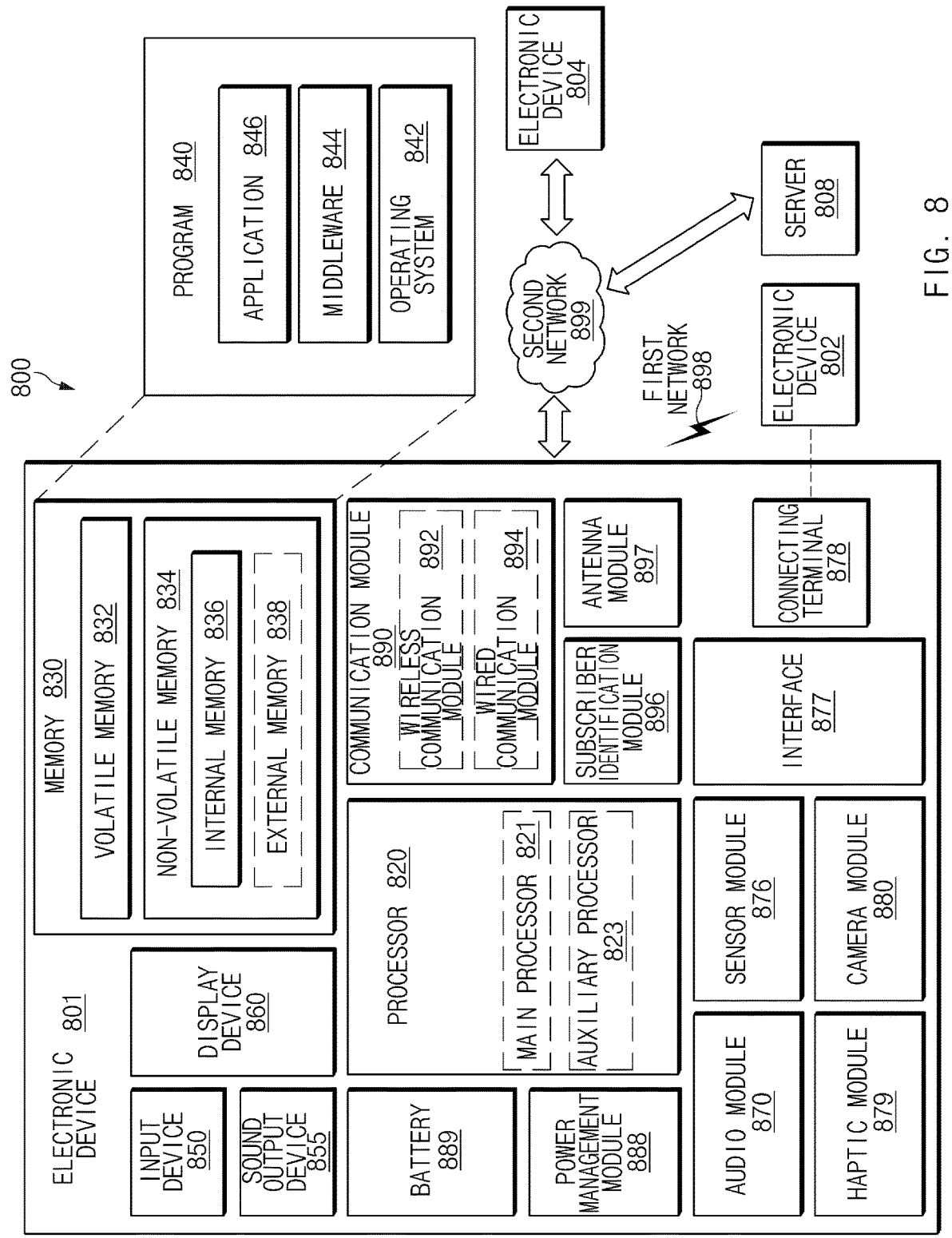
FIG. 8 is a block diagram illustrating an electronic device in a network environment according to various embodiments.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820 and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Figure 9:
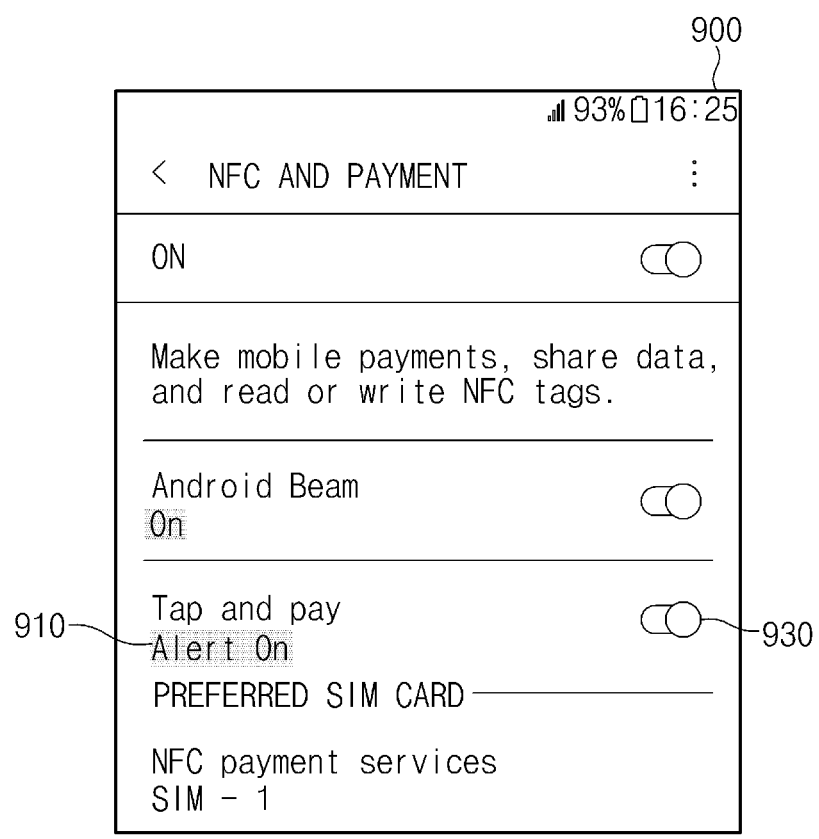
FIG. 9 is a diagram illustrating an example configuration screen of a card emulation (CE) service according to an embodiment.

FIG. 9 is a diagram illustrating an example configuration screen of a CE service according to an embodiment.

Referring to FIG. 9, an electronic device (e.g., an electronic device 100 of FIG. 1) may output a configuration screen 900 of a CE service of NFC technology on a display (e.g., a display 150 of FIG. 1). Thus, a user may set to use the CE service, such as a credit card, a debit card, a transportation card, an ID card, or a smart card, through the configuration screen 900 of the CE service.

According to an embodiment, the configuration screen 900 of the CE service may include a display object which functions to select (or change) whether to use the CE service. For example, as shown in FIG. 9, the display object may include a menu item object.

According to an embodiment, the display object may include an object 930 (e.g., a button object) capable of selecting (or changing) whether to provide a notification to the user, upon processing completion for a specified function (e.g., a payment function, an identification card function, a smart key function, or the like) included in the CE service, and an object 910 (e.g., a text object) indicating whether to provide a currently set notification.

According to an embodiment, the object 930 capable of selecting (or changing) whether to provide the notification to the user may operate in a toggle manner. For example, in a first state set such that the object 930 provides a notification to the user, when a user input for selecting the object 930 occurs, the object 930 may change to a second state set not to provide the notification to the user. In the second state set such that the object 930 does not provide the notification to the user, when a user input for selecting the object 930 occurs, the object 930 may change to the first state set to provide the notification to the user. An object 910 indicating whether to provide a currently set notification may include a text (e.g., "Alert On") indicating that it is set to provide the notification to the user in the first state and may include a text (e.g., "Alert Off") indicating that it is set not to provide the notification to the user in the second state.

Figure 10:
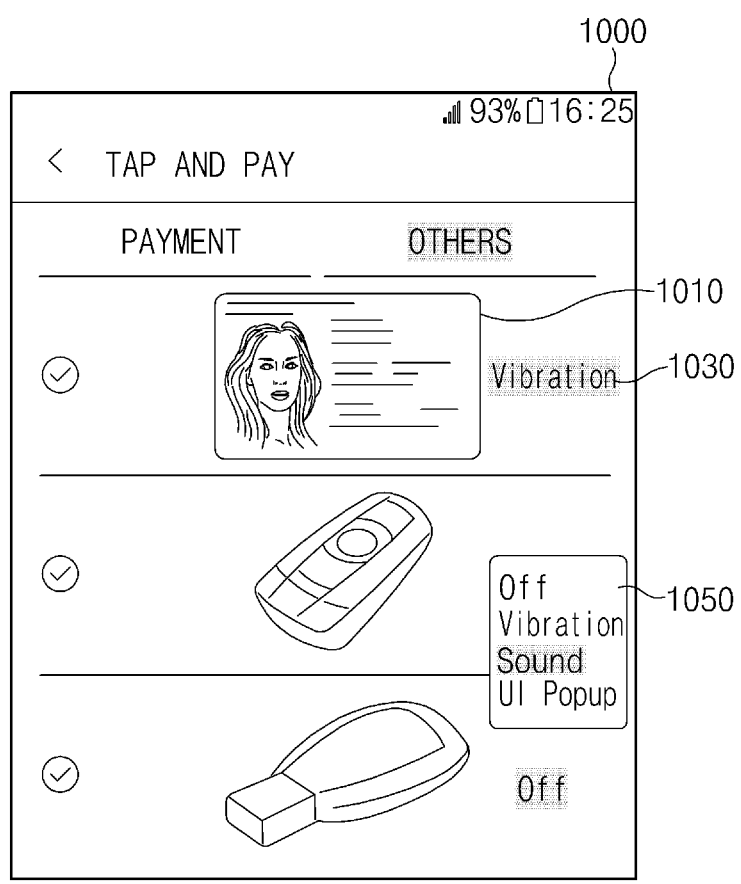
FIG. 10 is a drawing illustrating an example configuration screen of a notification method based on a type of a CE service, according to an embodiment.

FIG. 10 is a diagram illustrating an example configuration screen of a notification method according to a type of a CE service, according to an embodiment.

Referring to FIG. 10, an electronic device (e.g., an electronic device 100 of FIG. 1) may output a configuration screen 1000 of a notification method according to a type of a CE service on a display (e.g., a display 150 of FIG. 1). Thus, a user may set a different notification method (e.g., a vibration, sound, pop-up object output or the like) for each type of the CE service.

According to an embodiment, the configuration screen 1000 of the notification method according to the type of the CE service may include an object 1010 indicating a type of an available CE service and an object 1030 indicating a set notification method.

According to an embodiment, the object 1010 indicating the type of the available CE service may include a text, an image, or the like indicating a type of a service associated with an applet (e.g., an applet 191 of FIG. 1) installed in an SE (e.g., an SE 190 of FIG. 1). For example, the object 1010 may include a text, an image, or the like indicating a type of a service such as a credit card, a debit card, a transportation card, an ID card, or a smart key.

According to an embodiment, the object 1030 indicating the set notification method may include a text, an image, or the like indicating a notification method set for each type of the CE service. For example, the object 1030 may include a text, an image, or the like indicating a notification method set for each type of a service such as a credit card, a debit card, a transportation card, an ID card, or a smart key. The notification method may include, for example, a vibration, sound (voice), or popup object output or the like.

According to an embodiment, when a user input for selecting the object 1010 occurs, the electronic device may output an object 1050 (e.g., a list object) capable of selecting (or changing) a notification method for a CE service corresponding to a location where the user input occurs on the screen 1000. The object 1050 may include, for example, a text, an image, or the like corresponding to a type of the notification method. When any one item included in the object 1050 is selected through a user input, a notification for a corresponding service may be selected (or changed) as a notification method corresponding to the selected item. Furthermore, the object 1050 may include an item capable of setting not to provide a notification for each CE service. Thus, when an item capable of setting not to provide a notification included in the object 1050 is selected through the user input, it may be set not to provide a notification for a corresponding service.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
   a secure element (SE) comprising circuitry and including an applet configured to provide a service using near field communication (NFC);
   an NFC circuit configured to provide NFC with a first external electronic device;
   a memory; and
   a processor electrically connected with the NFC circuit and the memory,
   wherein the NFC circuit comprises a monitoring circuit configured to analyze a first signal received from the applet, and
   wherein the monitoring circuit is configured to provide a second signal corresponding to processing completion for a specified function included in the service to the processor based on a result of analyzing the first signal.

2. The electronic device of claim 1, further comprising:
   at least one of: a display, a speaker, and a haptic module comprising haptic circuitry,
   wherein the processor is configured to control the electronic device to notify a user of the processing completion for the specified function through at least one of: the display, the speaker, and the haptic module in response to receiving the second signal.

3. The electronic device of claim 1, further comprising:
   a display,
   wherein the processor is configured to control the electronic device to output a list including at least one method for notifying a user of the processing completion for the specified function on the display, and to control the electronic device to enable selection of the method depending on a type of the applet.

4. The electronic device of claim 1, wherein the SE comprises at least one of: a secure module comprising secure circuitry, a chipset, and a secure key capable of performing user authentication.

5. The electronic device of claim 1, wherein the service comprises a card emulation service, and
wherein the specified function comprises at least one of: a payment function, an identification card function, and a smart key function.

6. The electronic device of claim 1, further comprising:
a communication circuit configured to communicate with a second external electronic device,
wherein the processor is configured to:
receive identification information of the applet and a code value indicating the processing completion for the specified function from the second external electronic device via the communication circuit;
map the identification information of the applet to the code value; and
store the mapped information in the memory.

7. The electronic device of claim 6, wherein the processor is configured to deliver the mapped information to the NFC circuit.

8. The electronic device of claim 7, wherein the monitoring circuit is configured to:
determine whether the code value included in the mapped information exists in the first signal; and
deliver the second signal to the processor, based on the code value existing in the first signal.

9. The electronic device of claim 6, further comprising:
a global positioning system (GPS) comprising global positioning circuitry,
wherein the processor is configured to:
determine a location of the electronic device based on location information of the electronic device, the location information being obtained via the GPS;
determine whether the service provided by the applet is available in the location of the electronic device; and
deliver the mapped information to the NFC circuit, based on the service being available in the location of the electronic device.

10. The electronic device of claim 1, wherein the monitoring circuit is configured to stop analyzing the first signal, based on power supplied to the NFC circuit being less than or equal to a specified level.

11. A method for providing a service using NFC in an electronic device, the method comprising:
receiving a first signal from an applet installed in an SE and configured to provide a service using the NFC;
analyzing the first signal via a monitoring circuit included in an NFC circuit configured to provide NFC with a first external electronic device; and
delivering a second signal corresponding to processing completion for a specified function included in the service to a processor of the electronic device based on a result of analyzing the first signal.

12. The method of claim 11, further comprising:
notifying a user of the processing completion for the specified function through at least one of: a display, a speaker, and a haptic module of the electronic device.

13. The method of claim 11, further comprising:
outputting a list including at least one method for notifying a user of the processing completion for the specified function on a display of the electronic device to enable selection of the method according to a type of the applet.

14. The method of claim 11, wherein the SE comprises a secure module comprising at least one of: secure circuitry, a chipset, and a secure key capable of performing user identification.

15. The method of claim 11, wherein the service comprises a card emulation service, and
wherein the specified function comprises at least one of: a payment function, an identification card function, and a smart key function.

16. The method of claim 11, further comprising:
receiving identification information of the applet and a code value indicating the processing completion for the specified function from a second external electronic device via a communication circuit configured to provide communication with the second external electronic device;
mapping the identification information of the applet to the code value; and
storing the mapped information in a memory of the electronic device.

17. The method of claim 16, further comprising:
delivering the mapped information to the NFC circuit.

18. The method of claim 17, wherein the analyzing of the first signal comprises:
determining whether the code value included in the mapped information exists in the first signal, and
wherein the delivering of the second signal to the processor is performed based on the code value existing in the first signal.

19. The method of claim 16, further comprising:
obtaining location information of the electronic device via a GPS of the electronic device;
determining a location of the electronic device based on the location information;
determining whether the service provided by the applet is available in the location of the electronic device; and
delivering the mapped information to the NFC circuit based on the service being available in the location of the electronic device.

20. The method of claim 11, further comprising:
stopping analyzing the first signal based on power supplied to the NFC circuit being less than or equal to a specified level.

* * * * *